United States Patent
Ochiai

[19]

[11] Patent Number: 5,994,789
[45] Date of Patent: Nov. 30, 1999

[54] CONTROL SYSTEM FOR AN ELECTRIC VEHICLE

[75] Inventor: Shinobu Ochiai, Wako, Japan

[73] Assignee: Honda Giken Kogyo Kabushiki Kaisha, Tokyo, Japan

[21] Appl. No.: 09/035,973

[22] Filed: Mar. 6, 1998

[51] Int. Cl.$^6$ .................................................... H02J 1/10
[52] U.S. Cl. ...................... 307/10.1; 180/65.3; 307/19; 320/138
[58] Field of Search ................... 307/91.1, 10.1, 307/10.7, 46, 48, 18, 19, 20; 320/104, 124, 127, 134, 136–138, 166; 180/65.3, 65.1, 65.8; 318/139

[56] References Cited

U.S. PATENT DOCUMENTS

| | | |
|---|---|---|
| 5,619,107 | 4/1997 | Shinohara et al. ...................... 307/10.7 |
| 5,717,310 | 2/1998 | Sakai et al. .............................. 307/10.1 |
| 5,783,872 | 7/1998 | Blair ......................................... 307/46 |
| 5,793,189 | 8/1998 | Kawaguchi et al. ..................... 320/136 |

*Primary Examiner*—Richard T. Elms
*Attorney, Agent, or Firm*—Nikaido, Marmelstein, Murray & Oram LLP

[57] ABSTRACT

A system is provided to effectively use the electric charge of a capacitor provided for an inverter in an electric vehicle when the capacitor discharges and to decrease the time required for discharge. An inverter for converting the DC electric power of a main battery into AC electric power to drive a traveling motor is provided with a smoothing capacitor to be charged through a precharge contactor. A DC/DC converter is used to charge a sub-battery using the electric power from the main battery when an electric vehicle runs. When the capacitor discharges, the electric charge of the capacitor is used to charge the sub-battery through the DC/DC converter. Because no discharge circuit is used when the capacitor discharges, it is possible to complete discharge in a short time and without the generation of heat by the discharge circuit.

4 Claims, 3 Drawing Sheets

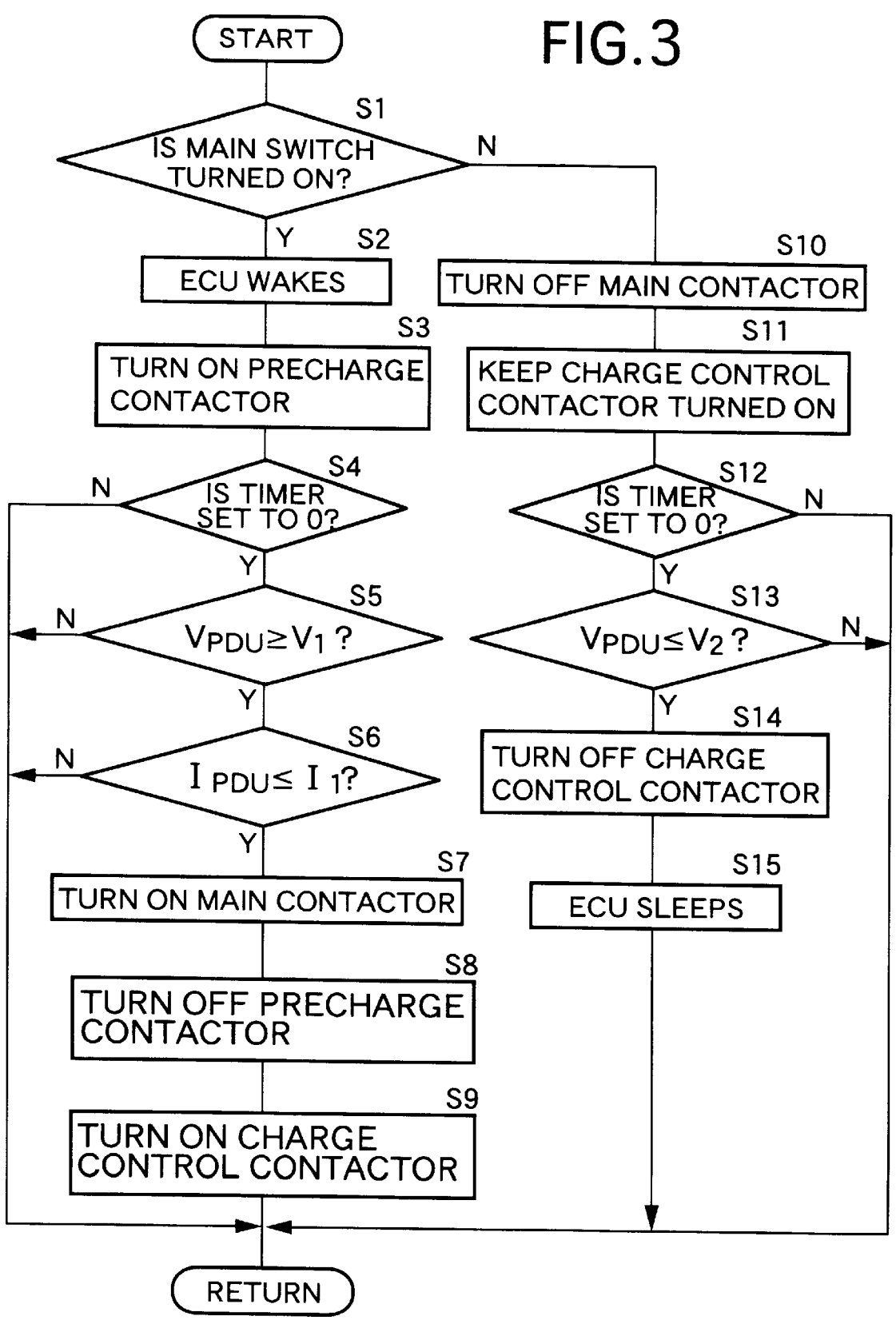

CONTROL SYSTEM FOR AN ELECTRIC VEHICLE

BACKGROUND OF THE INVENTION

1. Field of the Invention

The present invention relates to a control system for an electric vehicle provided with an inverter for converting DC electric power of a main battery into AC electric power to drive a traveling motor.

2. Description of the Prior Art

In prior art electric vehicle control systems, a large-capacity electrolytic capacitor is provided between the terminals at the input side of the inverter of an electric vehicle in order to stabilize the operation of the inverter by smoothing the fluctuation of voltage. It is necessary to discharge the electric charge stored in the capacitor when stopping the traveling of the electric vehicle. Conventionally, discharge of the capacitor has been made by converting the electric charge into heat by means of a resistor provided in the discharge circuit (for example, see Japanese Patent Application No. 6-161535).

However, it is a wasteful use of electric power to abandon the electric charge of the large-capacity capacitor in the form of heat and moreover, a problem occurs because the discharge time increases in order to avoid sudden heat generation by the resistor.

SUMMARY OF THE INVENTION

The present invention is made to solve the above problems and its object is to effectively use the electric charge of a capacitor provided for an inverter of an electric vehicle, when the capacitor discharges and to decrease the time required for discharge.

In the present invention, control means supplies the electric charge of a capacitor to a sub-battery through a DC/DC converter, when discharging the electric charge of the capacitor by stopping the electric vehicle. Therefore, the electric charge of the capacitor is not wastefully consumed as heat and it is possible to effectively use the electric charge to charge the sub-battery. Moreover, because a discharge circuit is unnecessary, the cost is reduced and, it is possible to complete the discharge in a short time without considering the heat produced by a prior art discharge circuit.

BRIEF DESCRIPTION OF THE DRAWINGS

FIG. 3 is a flow chart for explaining the functions of one embodiment of the present invention.

DETAILED DESCRIPTION OF THE PREFERRED EMBODIMENT

Figure 1:
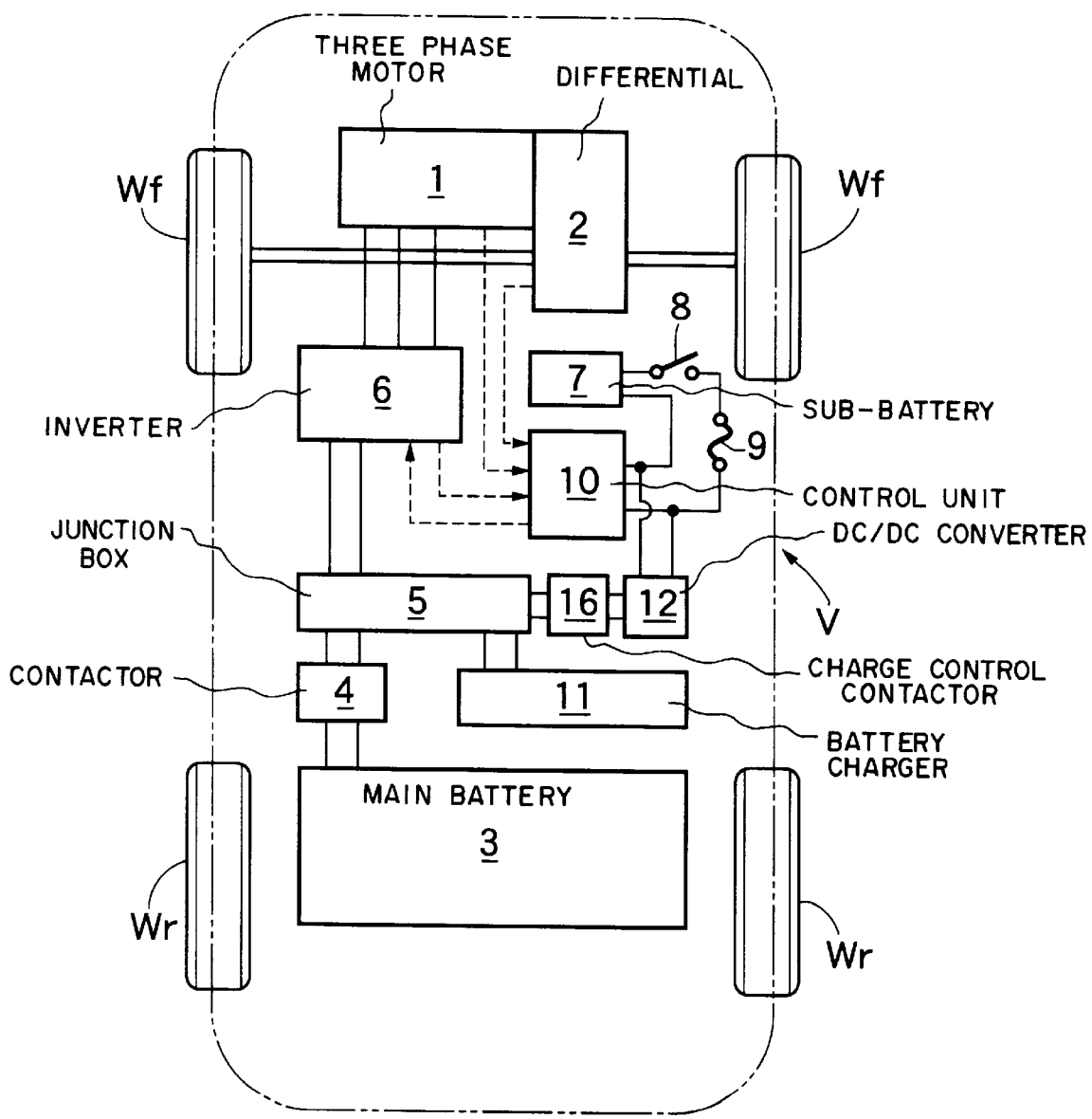
FIG. 1 is an illustration showing the entire structure of an electric vehicle including one embodiment of the present invention.
Figure 2:
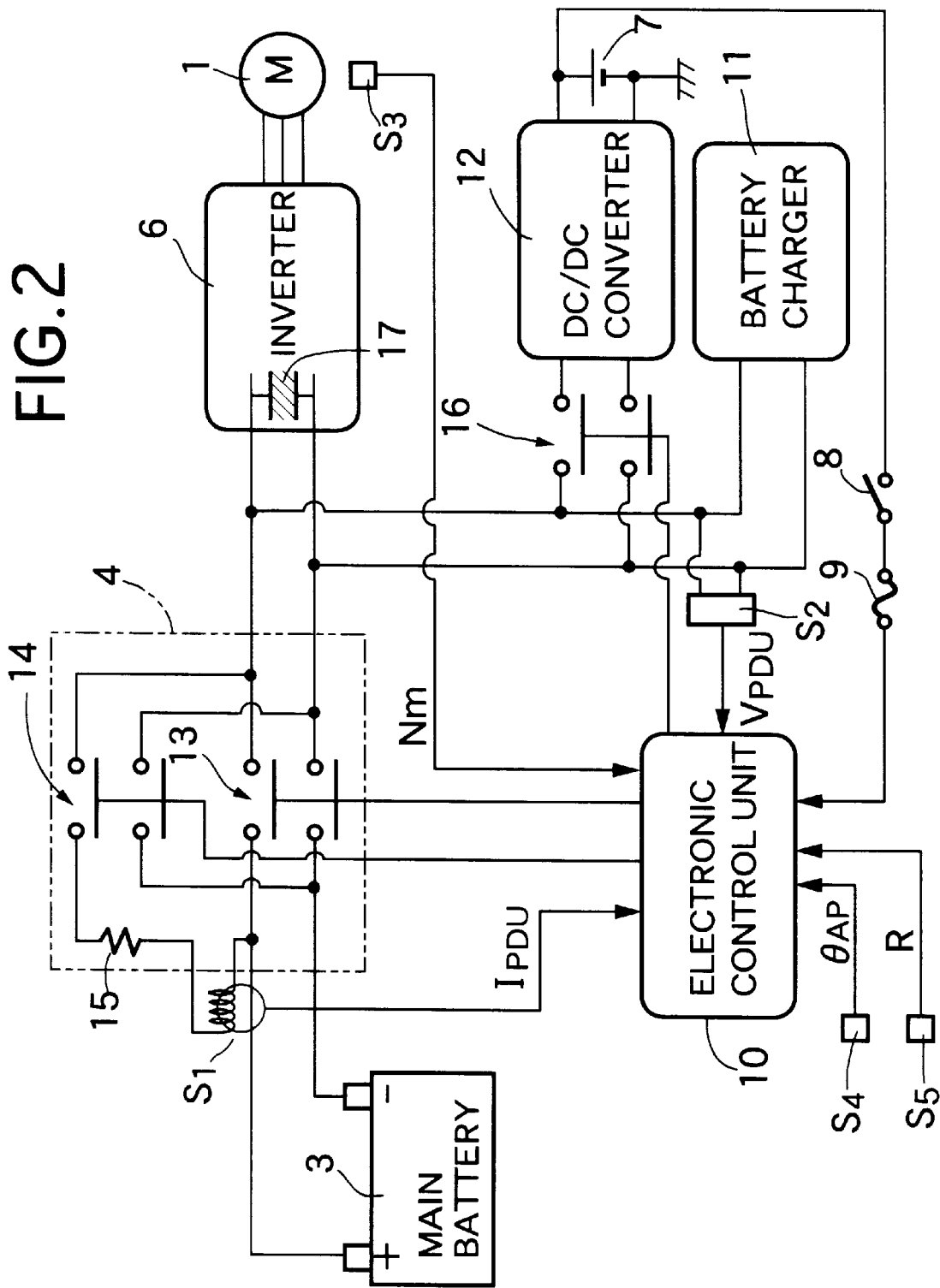
FIG. 2 is a block diagram of a control system according to one embodiment of the present invention.

As shown in FIGS. 1 and 2, a four-wheel electric vehicle V has a pair of right and left front wheels Wf and Wf serving as driven wheels. The torque of a traveling motor 1 comprising a three-phase AC motor, is transmitted to wheels Wf, Wf through a differential 2. A pair of right and left rear wheels Wr and Wr serve as follower wheels. A power drive unit comprises a main battery 3, for example, a 288 volt battery mounted on the rear of the electric vehicle V connected to the traveling motor 1 through a contactor 4, a junction box 5, and an inverter 6. An electronic control unit 10 is connected to a sub-battery 7 of, for example, 12 volts, through a main switch 8, and a fuse 9, and is connected to the inverter 6 in order to control the driving torque and regenerative torque of the traveling motor 1. The junction box 5 connects with a battery charger 11 in order to charge the main battery 3 with electric power supplied from an external power supply and also, connects with a DC/DC converter 12 in order to charge the sub-battery 7 with the electric power of the main battery 3 or the electric charge of a smoothing capacitor 17 to be described later.

The contactor 4 is provided with a main contactor 13 and a precharge contactor 14 connected in parallel. The precharge contactor 14 is serially connected to a precharge resistor 15. Moreover, the DC/DC converter 12 is connected to the main battery 3 and the inverter 6 through a charge control contactor 16. Opening or closing of the main contactor 13, precharge contactor 14, and charge control contactor 16 is controlled by the electronic control unit 10.

A current sensor $S_1$ provided for a DC section for connecting the main battery 3 with the inverter 6, is used for detection of the current $I_{PDU}$ flowing through the main contactor 13 and detection of current $I_{PDU}$ flowing through the precharge contactor 14. That is, the current $I_{PDU}$ flowing through the precharge contactor 14 having the precharge resistor 15, is smaller than the current $I_{PDU}$ flowing through the main contactor 13. Therefore, by winding a coil of one turn, on a conductive wire connected to the main contactor 13 and winding a coil of a plurality of turns, on a conductive wire connected to the precharge contactor 14, it is possible to detect a large current flowing through the main contactor 13 and a small current flowing through the precharge contactor 14 with the common current sensor $S_1$ at the same accuracy. The current sensor $S_1$ is connected to the electronic control unit 10.

A DC-section voltage $V_{PDU}$ detected by a voltage sensor $S_2$, a motor rotational speed Nm detected by a motor rotational speed sensor $S_3$, an accelerator opening degree $\theta_{AP}$ detected by an accelerator opening degree sensor $S_4$, and a shift range R detected by a shift range sensor $S_5$ are inputted to the electronic control unit 10.

The inverter 6 is provided with a plurality of switching elements. Therefore, by inputting a switching signal to each switching element from the electronic control unit 10, the inverter 6 converts the DC electric power of the main battery 3 into three-phase AC electric power to supply it to the traveling motor 1, when the traveling motor 1 operates and converts the three-phase electric power generated by the traveling motor 1 into DC electric power to supply it to the main battery 3, when the traveling motor 1 is driven (at the time of regeneration). Moreover, the smoothing capacitor 17 comprising an electrolytic capacitor, is connected between high-potential and low-potential input terminals of the inverter 6.

The inverter 6 is controlled in a PWM (pulse width modulation) manner in the region of the low rotational speed side of the traveling motor 1 and controlled in a manner of so-called field-weakening control in the region of the high rotational speed side of the motor 1 after the duty ratio of the PWM control reaches 100%. The field weakening control provides a field current component for the primary current to be supplied to the traveling motor 1 so that a magnetic field in the opposite direction to the magnetic field generated by a permanent magnet of the traveling motor 1, is generated, which extends the rotational speed of the traveling motor 1 to the high rotational speed side by weakening the entire magnetic field.

Then, functions of the electric vehicle V under traveling are described below.

The electronic control unit 10 calculates a torque command value $Q_{TRQ}$ to be generated by a driver in the traveling motor 1 in accordance with the motor rotational speed Nm detected by a motor rotational speed sensor $S_3$, accelerator opening degree $\theta_{AP}$ detected by an accelerator opening degree sensor $S_4$, and shift range R detected by a shift range sensor $S_5$ by using a preset torque map. The unit 10 calculates a target electric power to be supplied to the traveling motor 1 or to be taken from the traveling motor 1 through regeneration, by multiplying the torque command value $Q_{TRQ}$ by the motor rotational speed Nm detected by a motor rotational speed sensor $S_3$. The target electric power has a positive value or negative value. Positive target electric power corresponds to the situation in which the traveling motor 1 generates driving torque, and negative target electric power corresponds to the situation in which the traveling motor 1 generates regenerative torque.

The electronic control unit 10 calculates actual electric power to be inputted to the inverter 6 by multiplying the current $I_{PDU}$ of the DC section of the inverter 6 detected by the current sensor $S_1$, by the voltage $V_{PDU}$ of the DC section of the inverter 6 detected by the voltagesensor $S_2$. The actual electric power has a positive value or negative value the same as does the target electric power. Positive electric power corresponds to the situation in which the traveling motor 1 generates a driving torque and negative actual electric power corresponds to the situation in which the traveling motor 1 generates regenerative torque. Moreover, the electronic control unit 10 compares the target electric power with the actual electric power and feedback-controls the traveling motor 1 in order to converge the deviation between the target electric power and the actual electric power to zero.

The functions of the capacitor 17 provided for the inverter 6 during charge and discharge, are described below by referring to the flow chart in FIG. 3.

First, when the main switch 8 is turned on in Step S1 in order to run the electric vehicle V, the electronic control unit 10 which is in the sleep mode in Step S2 is set to the wake mode and the precharge contactor 14 is turned on in Step S3 in accordance with a command supplied from the electronic control unit 10. As a result, the charging of the capacitor 17 connected to the main battery 3 through the precharge resistor 15 and precharge contactor 14, is started. In this case, by decreasing the current surge at the moment when precharge contactor 14 is turned on, by means of the precharge resistor 15, it is possible to prevent the contact point of the precharge contactor 14 from being damaged.

After a predetermined time (e.g. 2 seconds) passes and the time set in a timer started at the same time the main switch 8 is turned on, expires in Step S4, the voltage $V_{PDU}$ of the DC section of the inverter 6 detected by the voltage sensor $S_2$ (that is, the voltage of the capacitor 17) rises to a predetermined voltage $V_1$ or higher in step S5, and the current $I_{PDU}$ of the DC section of the inverter 6, detected by the current sensor $S_1$ (that is, the current flowing through the capacitor 17), decreases to a predetermined current $I_1$ or less in step S6, it is judged that charge of the capacitor 17 is completed.

Thus, when charge of the capacitor 17 is completed, the main contactor 13 is turned on in Step S7 and also the precharge contactor 14 is turned off in Step S8. Thereafter the voltage of the main battery 3 is lowered with electric power by the DC/DC converter 12 by turning on the charging contactor 16 in Step S9 to charge the sub-battery 7. Thus, the electric vehicle V is brought into a traveling state.

To stop the traveling of the electric vehicle V, the main switch 8 is turned off in Step S1, and the main contactor 16 is turned off in Step S10. In this situation, because the charging contactor 16 is kept turned on in Step S11, the electric charge of the capacitor 17 is supplied to the sub-battery 7 through the charging contactor 16 and the DC/DC converter 12.

When a predetermined time (e.g. 10 seconds) passes and the time set to the timer started at the same time when the main switch 8 is turned off, expires in Step S12, and the voltage $V_{PDU}$ detected by the voltage sensor $S_2$ has dropped to a predetermined voltage $V_2$ or lower in Step S13, it is judged that discharge of the capacitor 17 is completed, the charging contactor 16 is turned off in Step S14 and thereafter, the electronic control unit 10 is set to the sleep mode in Step S15.

Thus, the electric charge stored in the capacitor 17 can be effectively used to charge the sub-battery 7 without losing the charge in the form of heat, by a discharge circuit when stopping the traveling of the electric vehicle V. Moreover, to consume the electric charge of the capacitor 17 using the discharge circuit, a period of approximately 1 minute is necessary to avoid sudden heat generation by the discharge circuit. However, this embodiment makes it possible to complete the discharge of the capacitor 17 for approximately 10 seconds. Therefore, it is possible to decrease the discharge waiting time for setting the electronic control unit 10 to the sleep mode and the discharge waiting time for maintaining a high-voltage circuit and moreover, reduce the cost by not using a discharge circuit.

As described above, the electric charge of a smoothing capacitor connected in parallel to an inverter, is supplied to a sub-battery through a DC/DC converter when the capacitor discharges. Therefore, it is possible to effectively use the electric charge of the capacitor to charge the sub-battery without wastefully consuming the electric charge.

Moreover, because no discharge circuit is used, the structure is simplified and the cost is reduced. Furthermore, it is possible to complete discharge in a short time without the radiation of heat, because the electric charge is not converted into heat at the time of discharge.

The embodiment of the present invention is described above in detail. Moreover, various modifications of the present invention are allowed as long as they are not deviated from the gist of the present invention.

I claim:

1. A control system for an electric vehicle, comprising:
    an inverter for converting DC electric power of a main battery into AC electric power to drive a traveling motor;
    a smoothing capacitor connected in parallel with the inverter;
    control means for controlling charge/discharge of the capacitor and the inverter;
    a sub-battery coupled to the control means for supplying power to the control means; and
    a DC/DC converter connected to the sub-battery for charging the sub-battery using the main battery, wherein the control means further connects the capacitor to the DC/DC converter for supplying the electric charge of the capacitor to the sub-battery through the DC/DC converter, when the capacitor discharges.

2. A control system for an electric vehicle as set forth in claim 1, wherein when the charge of the capacitor is supplied to the sub-battery for a predetermined period of time, the control means disconnects the capacitor from the DC/DC converter.

3. A control system for an electric vehicle as set forth in claim 1, wherein when the voltage across the capacitor is less than a predetermined voltage, the control means disconnects the capacitor from the DC/DC converter.

4. A control system for an electric vehicle as set forth in claim 1, wherein said control means operates with supply of power from said sub-battery, and the supply of power from the sub-battery to the control means stops when the electric discharge from the capacitor to the sub-battery stops.

* * * * *

UNITED STATES PATENT AND TRADEMARK OFFICE
CERTIFICATE OF CORRECTION

PATENT NO. : 5,994,789
DATED : November 30, 1999
INVENTOR(S) : Shinobu OCHIAI

It is certified that error appears in the above-indentified patent and that said Letters Patent is hereby corrected as shown below:

On the title page:

Item [30] --March 7, 1997 [JP] Japan 9-052645--

Signed and Sealed this

Thirteenth Day of March, 2001

Attest:

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO. : 5,994,789

DATED : November 30, 1999

INVENTOR(S) : Ochiai

It is certified that error appears in the above-identified patent and that said Letters Patent is hereby corrected as shown below:

Item [30] Information is missing, please insert therefor,

-- Jul. 3, 1997 [JP] Japan ............. 52645 --

Signed and Sealed this

Third Day of April, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

| | |
|---|---|
| PATENT NO. : 5,994,789 | Page 1 of 1 |
| DATED : November 30, 1999 | |
| INVENTOR(S) : Shinobu Ochiai | |

It is certified that error appears in the above-identified patent and that said Letters Patent is hereby corrected as shown below:

<u>Title page,</u>
Insert the following: Item [30] -- March 7, 1997 [JP] Japan 9-052645 --

Signed and Sealed this

Twenty-eighth Day of August, 2001

*Attest:*

*Nicholas P. Godici*

*Attesting Officer*

NICHOLAS P. GODICI
*Acting Director of the United States Patent and Trademark Office*